United States Patent
Caillot et al.

(10) Patent No.: US 11,623,615 B2
(45) Date of Patent: Apr. 11, 2023

(54) LIQUID SPRAYING WIPER FRAME FOR MOTOR VEHICLE WINDOWS, AND OPTIMISATION OF THE SEALING OF THIS FRAME

(71) Applicant: Valeo Systèmes d'Essuyage, Le Mesnil Saint Denis (FR)

(72) Inventors: Gérald Caillot, Le Mesnil Saint Denis (FR); Christophe Chassaing, Issoire (FR); Jean-Michel Jarasson, Le Mesnil Saint Denis (FR); Pierre Sevellec, Issoire (FR); Denis Thebault, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 17/280,424

(22) PCT Filed: Sep. 18, 2019

(86) PCT No.: PCT/EP2019/074931
§ 371 (c)(1),
(2) Date: Mar. 26, 2021

(87) PCT Pub. No.: WO2020/064445
PCT Pub. Date: Apr. 2, 2020

(65) Prior Publication Data
US 2022/0001839 A1    Jan. 6, 2022

(30) Foreign Application Priority Data
Sep. 28, 2018 (FR) .................................. 1858994

(51) Int. Cl.
*B60S 1/38* (2006.01)
*B60S 1/52* (2006.01)

(52) U.S. Cl.
CPC ........... *B60S 1/3894* (2013.01); *B60S 1/3887* (2013.01); *B60S 1/524* (2013.01)

(58) Field of Classification Search
CPC ........ B60S 1/524; B60S 1/522; B60S 1/3886; B60S 1/3887; B60S 1/3889; B60S 1/3894;
(Continued)

(56) References Cited

U.S. PATENT DOCUMENTS 2,910,715 A * 11/1959 Ohrt ........................ B60S 1/524
15/250.04
3,418,676 A * 12/1968 Byczkowski ............. B60S 1/48
15/250.07
(Continued)

FOREIGN PATENT DOCUMENTS

DE         10000373     *  8/2001
DE      102008020227    * 11/2009
(Continued)

OTHER PUBLICATIONS

Machine translation of description portion of German publication 102008020227, published Nov. 2009. (Year: 2009).*
(Continued)

*Primary Examiner* — Gary K. Graham
(74) *Attorney, Agent, or Firm* — Osha Bergman Watanabe & Burton LLP

(57) ABSTRACT

The invention relates to a wiper frame (10) comprising a device (24), in particular an aerodynamic deflector, for dis-pensing and/or spraying liquid, comprising at least one liquid flow channel (26), a longitudinal end (27) of which opens on an end face (28) of the device (24), a plug (40) for closing off the longitudinal end (27) of the liquid flow channel (26), which is inserted inside a longitudinal end section (27) of said channel (26), and a tip (30) arranged (Continued)

opposite the end face (28) of the device (24), characterised in that the closing plug (40) is a separate component from the tip (30), such as a spherical ball, such that the tip (30) and the plug (40) together ensure the closing off of the longitudinal end (27) of the liquid flow channel (26).

9 Claims, 3 Drawing Sheets

(58) Field of Classification Search
CPC ...... B60S 1/3896; B60S 1/3893; B60S 1/381; B60S 1/3891
USPC ......... 15/250.201, 250.04, 250.451–250.454
See application file for complete search history.

(56) References Cited

U.S. PATENT DOCUMENTS

| | | | | |
|---|---|---|---|---|
| 4,893,374 A | * | 1/1990 | Bienert | ...................... B60S 1/34 15/250.04 |
| 6,513,185 B1 | * | 2/2003 | Zimmer | .................. B60S 1/522 15/250.07 |
| 2003/0177599 A1 | * | 9/2003 | Wilson | .................... B60S 1/524 15/250.04 |
| 2005/0121465 A1 | | 6/2005 | Miranda | |
| 2006/0208007 A1 | | 9/2006 | Martin et al. | |
| 2014/0090200 A1 | | 4/2014 | Espinasse | |
| 2015/0040337 A1 | | 2/2015 | Espinasse | |
| 2018/0126956 A1 | * | 5/2018 | Lee | ....................... B60S 1/3887 |

FOREIGN PATENT DOCUMENTS

| | | | | |
|---|---|---|---|---|
| DE | 102012100777 A1 | | | 8/2013 |
| DE | 102017223526 | * | | 6/2019 |
| FR | 2920729 A1 | | | 3/2009 |
| JP | 2000-514340 A | | | 10/2000 |
| JP | 2006-255697 A | | | 9/2006 |
| WO | 1998/005378 A1 | | | 2/1998 |
| WO | 2002/016832 A1 | | | 2/2002 |
| WO | 2009/130183 A1 | | | 10/2009 |

OTHER PUBLICATIONS

Machine translation of description portion of German publication 102012100777, published Aug. 2013. (Year: 2013).*

International Search Report and Written Opinion in corresponding International Application No. PCT/EP2019/074931, dated Nov. 26, 2019 (10 pages).

Notification of Reason for Rejection issued in Japanese Patent Application No. 2021-517234, dated May 27, 2022 (13 pages).

Office Action issued in European Application No. 19768836.9 dated Feb. 17, 2023 (2 pages).

* cited by examiner

LIQUID SPRAYING WIPER FRAME FOR MOTOR VEHICLE WINDOWS, AND OPTIMISATION OF THE SEALING OF THIS FRAME

TECHNICAL FIELD OF THE INVENTION

The invention relates to a windshield wiper blade frame, also referred to as a wiper frame, notably for wiping the exterior surface of a window of a motor vehicle and which is associated with means for distributing and/or spraying a liquid onto the surface that is to be wiped.

TECHNICAL BACKGROUND OF THE INVENTION

The invention relates more particularly to a wiper frame comprising a liquid distributing and/or spraying device comprising at least one liquid circulation duct.

A motor vehicle is conventionally equipped with wipers, notably for cleaning the exterior surface of the windshield and thereby avoiding disruption to the driver's view of his surroundings.

A windshield wiper generally comprises a driving arm (also referred to as wiper arm or wiper carrier) that effects a, notably angular, back-and-forth movement, and a longitudinally elongate wiper frame that bears a wiper blade or blade rubber made of a resilient material such as rubber or an elastomer material.

The blade rubber rubs against the exterior surface of the windshield and evacuates the water by removing it from the driver's field of view.

In a conventional version, the wiper frame is produced in the form of articulated brackets which retain the wiper blade at several discrete locations that are distributed longitudinally, conferring a bend thereon that allows it to closely follow any curvature of the windshield.

In a more recent version known as "flat blade", the wiper frame is produced in the form of a semi-rigid assembly which holds the blade rubber along its entire length by virtue of one or more bending beams that make it possible to press the wiper and the blade rubber against the windshield without having to use brackets.

Such a design consists of a structure built around at least one one-piece longitudinal component made up of two functionally distinct parts. A first part is a support made of semirigid plastic comprising, on the one hand, a cavity in which should there is housed a stiffening rod, also referred to as a beam and, on the other hand, a claw holding the blade rubber that is made of an elastomeric material or of a rubber.

A second part of the one-piece longitudinal component is an accessory intended to improve the efficiency and quality of the wiping.

An accessory or component of a device for distributing/spraying a suitable washer fluid which, through combined action with the sweeping movement of the blade rubber, allows the removal of certain solid particles which may stick to the windows, may comprise at least one liquid circulation or transporting duct equipped with lateral holes through which the washer fluid is sprayed against the surface of the window that is to be wiped.

As taught for example in document FR-A1-2 920 729, the liquid distributing/spraying device is combined with an aerodynamic deflector which uses the wind relative to the vehicle to increase the force of contact of the wiper blade against the window that is to be wiped.

The complex longitudinal component incorporating the support function and at least the liquid distributing/spraying device function can be obtained by the coextrusion of at least two materials. A first material is a semirigid plastics material having longitudinal flexibility, and is intended to act as a support proper, whereas at least one other material, such as an elastomer, is used to perform at least the liquid spraying function.

That same document proposes a wiper frame which comprises at least one endpiece which is arranged at a first longitudinal end of the structure and which comprises means for plugging the liquid circulation duct.

The plugging means incorporated into the endpiece allow the liquid contained in the circulation duct to be pressurized so as to force the liquid to pass through the lateral holes of the duct for wetting or drenching the glazed surface that is to be wiped.

The transporting duct can be co-extruded with the longitudinal support of the wiper frame or can constitute separate components which are attached directly to the support by various means such as elastic clip-fastening, dovetail assembly, etc.

The at least one liquid circulation duct may also be incorporated into the blade rubber, or else it may be combined with an aerodynamic deflector of the wiper frame.

As illustrated in document FR-A1-2 920 729, the liquid circulation duct is created inside a profiled element constituting the aerodynamic deflector, with the advantage that the distributing/spraying device exhibits minimum bulk as it is therefore incorporated into the design of the deflector.

As illustrated in FIGS. 4a and 5a of that document, the plugging means incorporated into the endpiece comprise a stem of which the free end is shaped as a plug which can be inserted into the liquid transporting duct.

The invention seeks to improve the quality and sealing of the plugging of the liquid circulation duct.

BRIEF SUMMARY OF THE INVENTION

The invention proposes a wiper frame comprising a liquid distributing and/or spraying device comprising:
  at least one liquid circulation duct of which one longitudinal end opens into an end face of the device;
  a plug for plugging said longitudinal end of the liquid circulation duct and which is inserted into a longitudinal end portion of said duct;
  and an endpiece arranged facing said end face of the device, characterized in that the plug is a component distinct from the endpiece, so that the endpiece and the plug together plug said longitudinal end of the liquid circulation duct.
According to other features of the wiper frame:
  the plug comprises at least a plugging body of which the transverse cross section is the mate of that of the free end portion of said duct;
  the plug comprises a plugging body exhibiting symmetry of revolution, and the transverse cross section of the longitudinal end portion of the liquid circulation duct is circular;
  the plugging body of the plug is a spherical body;
  the plugging body of the plug is a portion of a sphere, of a cone, or of a cylinder;
  the plug comprises an insertion shank which axially extends the plugging body, in the direction of said end face of the device;

the plug for plugging said end of the liquid circulation duct is inserted axially into said longitudinal end portion of said duct;

the endpiece comprises a stem which is received inside said longitudinal end portion of said duct;

the stem is fixed inside said longitudinal end portion of the liquid circulation duct by bonding, welding or force-fitting;

the stem of the endpiece is tubular, and the insertion shank is housed in a complementary bore of the tubular insertion stem;

one longitudinal axial end of the insertion stem is housed in a complementary housing of the plug;

said longitudinal end portion of the liquid circulation duct belongs to a longitudinal end portion of the distribution device that is made based on at least one elastomer or rubber material;

the liquid circulation duct belongs to an aerodynamic deflector of the wiper frame.

BRIEF DESCRIPTION OF THE FIGURES

Further features and advantages of the invention will become apparent from reading the following detailed description, for an understanding of which reference is made to the appended drawings, in which.

DETAILED DESCRIPTION OF THE FIGURES

In the rest of the description, elements having an identical structure or similar functions will be denoted by the same references.

In the rest of the description, longitudinal, vertical and transverse orientations will be adopted, in a non-limiting manner and without reference to the Earth's gravitational field, as indicated by the "L,V,T" trihedron in the figures. A horizontal plane that extends longitudinally and transversely is also defined.

By convention, the longitudinal axis is oriented from the rear toward the front and extends overall along the main axis or direction of extension of the wiper frame.

Figure 1:
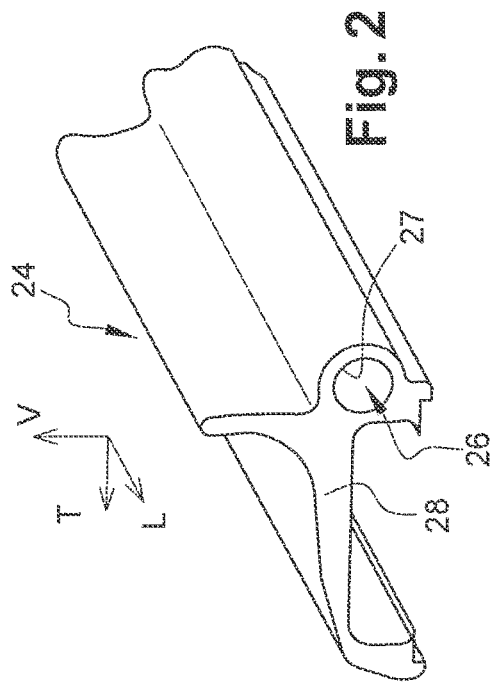
FIG. 1 is a perspective view of a longitudinal end portion of a wiper frame according to the invention, in section on a vertical and transverse plane.

FIG. 1 depicts a wiper frame 10 of the "flat blade" type, the structure of which comprises a longitudinal structural support 12 made for example of extruded plastics material.

The support 12 comprises a cavity which extends over its entire length and houses a stiffening beam 14 made of metal or of a plastics material.

The beam 14 takes the form of a flat strip which extends substantially in the horizontal plane and over the entire length of the wiper frame.

The longitudinal structural support 12 also comprises a longitudinal claw 16 which holds the upper bead 18 of a blade rubber 20 made of an elastomer material.

The blade rubber 20 comprises a lower part 22 which is able to cooperate with an exterior surface of a window that is to be wiped and which is connected to the upper bead 18 in an articulated manner so as to be able to pivot in both directions about the longitudinal axis of the whole.

Also depicted in FIG. 1 is an accessory 24 produced by extrusion independently of the longitudinal structural support 12, which is attached to the latter at its upper part and which likewise extends substantially over the entire length of the wiper frame.

The accessory 24 is an aerodynamic deflector, of known overall design, which comprises, arranged laterally along one of these longitudinal edges in the lower part, a duct 26 which extends over the entire length of the aerodynamic deflector 24 in order to allow fluid to circulate within the same.

Figure 2:
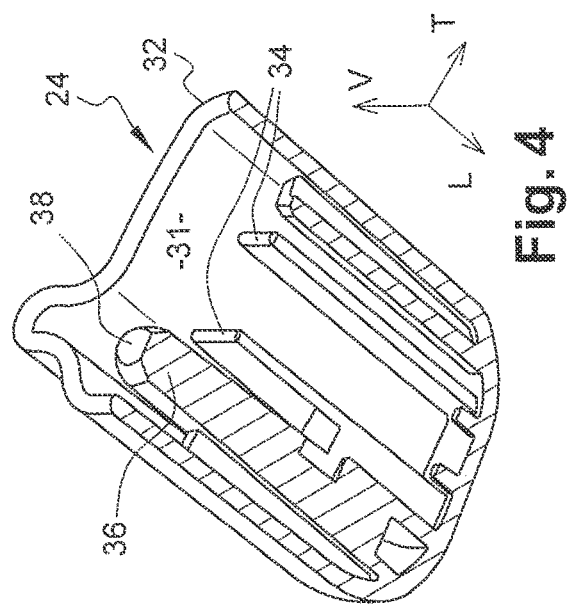
FIG. 2 is a perspective view of the aerodynamic deflector of the wiper frame of FIG. 1.

The duct 26 opens freely at the two ends of the aerodynamic deflector 24 and, notably here, as can be seen in FIG. 2, at the transverse and vertical front free end face 28 of the aerodynamic deflector 24.

Nonlimitingly, the duct 26 in this instance is cylindrical with a cross section of circular outline.

In a way that is known and not visible in the figures, the duct 26 is pierced with holes or slits distributed along its length so as, for example, to be able to spray a washer fluid onto the window that is to be wiped.

The wiper also comprises an endpiece at each of its longitudinal ends.

The front endpiece 30 illustrated in FIG. 1 is a component molded in rigid or semirigid plastics material which takes the form of a generally closed hollow shell delimited longitudinally toward the rear by a rear end edge 32 which extends in a vertical and transverse plane.

The edge 32 of the front endpiece 30 thus delimits an open rear face notably allowing the collection of other components 12, 14, 20 and 24, which have been assembled beforehand, to be introduced axially, in the longitudinal direction, into the internal cavity 31 of the front endpiece 30.

Alternatively, it is possible to pre-assemble a first subassembly comprising the front endpiece 30 and the aerodynamic deflector 24, and to mount this first subassembly on a second subassembly comprising the longitudinal structural support 12, the beam 14 and the blade rubber 20.

To do this, the front endpiece 30 is internally configured to complement the external contour of the profiled element that constitutes the aerodynamic deflector 24.

The front endpiece 30 preferably comprises two end-stops 34 arranged internally and which, in collaboration with a facing portion of the front end transverse face 28 of the aerodynamic deflector 24, determine the relative longitudinal position of the latter with respect to the front endpiece 30 when the components are in the mounted and fixed position.

Figure 3:
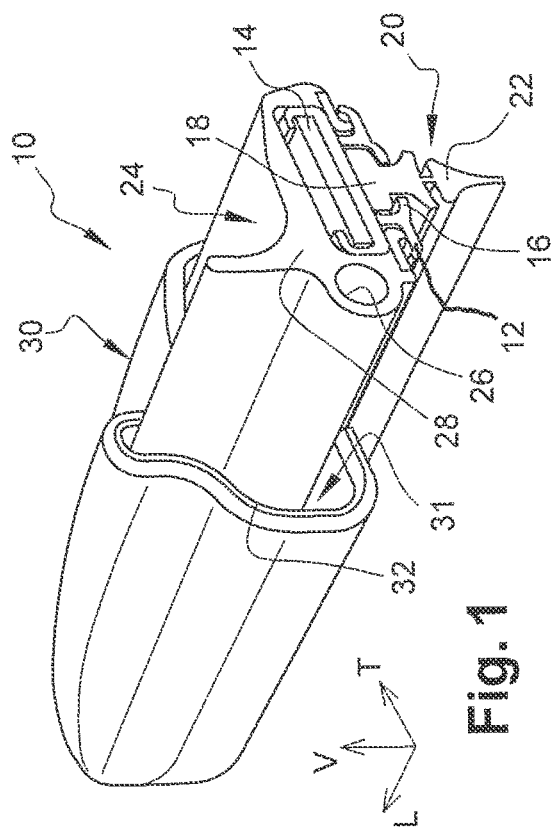
FIG. 3 is a perspective view of the endpiece of the wiper frame of FIG. 1.
Figure 4:
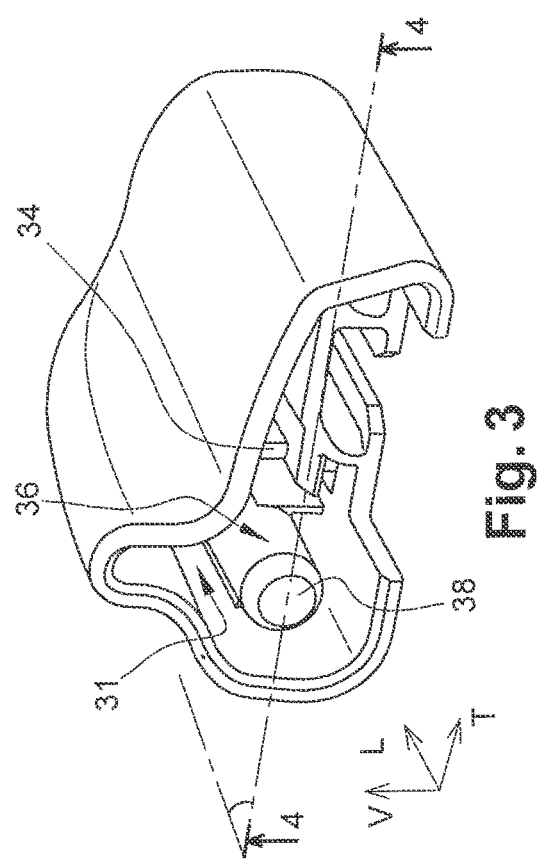
FIG. 4 is a perspective view of an upper portion of the endpiece of FIG. 3, which endpiece is depicted in section on the horizontal plane 4-4 of FIG. 3.

Inside the cavity 31, the front endpiece 30 also comprises a stem 36 which extends longitudinally and which is delimited by a rear transverse face 38 which, as can be seen notably in FIG. 3 et seq., is slightly offset towards the front with respect to the transverse plane of the rear edge 32.

When the collection of components is in the assembled position, the stem 36 is designed to be housed axially in the longitudinal direction inside a front free end portion 27 of the duct 26 which opens into the front end transverse face 28.

The outside diameter of the rear free end portion of the stem 36, which portion is able to be received in the front free end portion 27 of the duct 26, is greater than the inside diameter of this latter portion.

Figure 6:
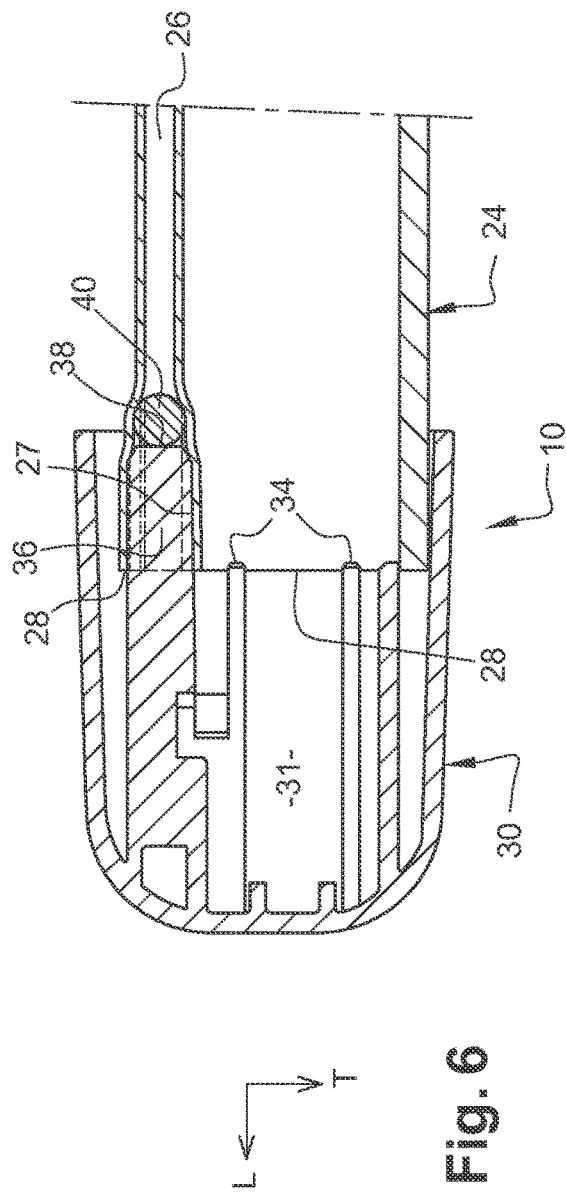
FIG. 6 is a view similar to that of FIG. 5, illustrating the three components of FIG. 5 in the assembled position in which the endpiece and the plug together plug the liquid circulation duct.

Because of this dimensional difference between the diameters and the length of the rear free end portion of the stem 36 which is able to be received in the front free end portion 27 of the duct 26, the stem 36 is axially forced-fitted into the duct 26 by elastic deformation of the constituent material of, in this instance, the aerodynamic deflector 24, causing radial deformation of the latter, as illustrated notably in FIG. 6.

The front endpiece 30 thus provides at least partial sealed closure of the front end of the duct 26 which opens into the front end transverse face 28.

According to the teachings of the invention, there is provided a plug 40 which is a component distinct from the front endpiece 30 so that the latter and the plug 40 together close or plug the front longitudinal end of the fluid circulation duct 26 with the best sealing possible.

Figure 5:
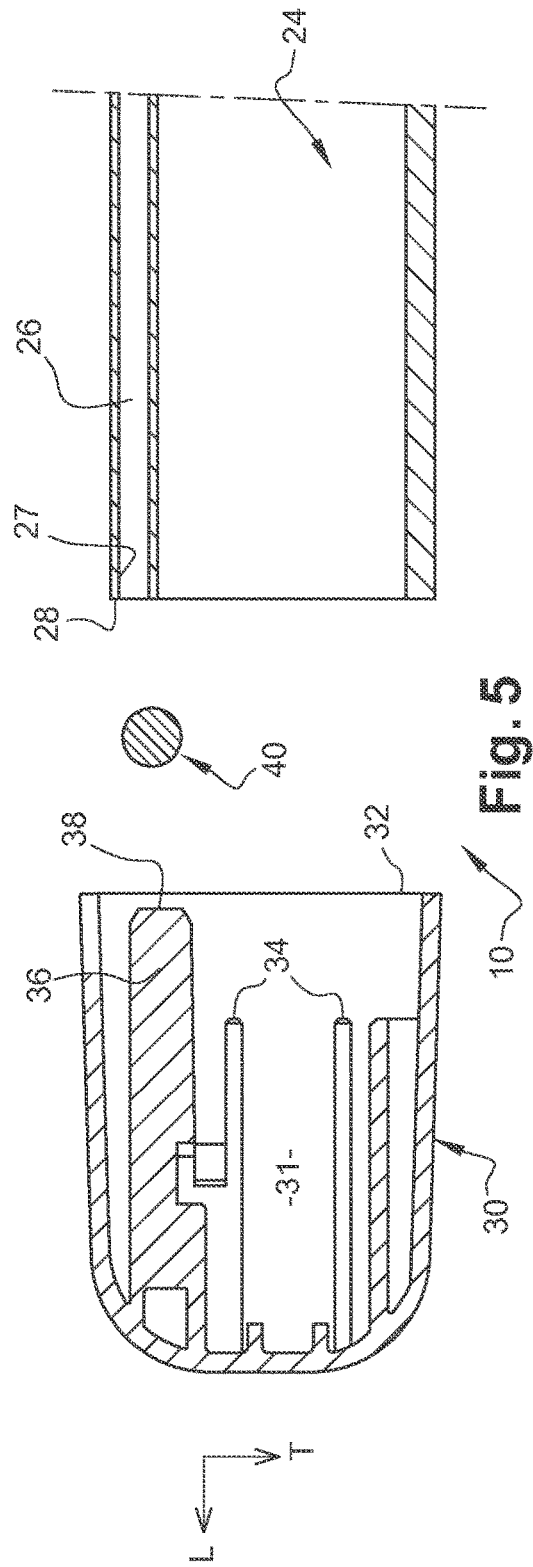
FIG. 5 is a view in section on a horizontal plane corresponding to the plane 4-4 of FIG. 3, and depicting, prior to their assembly, the endpiece, the spherical plug and the longitudinal front end portion of the aerodynamic deflector.

In the embodiment illustrated in FIGS. 5 and 6, the plug 40 is a spherical ball of which the outside diameter is greater than the inside diameter of the front free end portion 27 of the duct 26 intended to house the plug 40.

Nonlimitingly, the spherical ball that forms the plug 40 is made for example of metal, preferably a metal that does not rust.

For sealed mounting, and because of the difference in diameters, the spherical ball that forms the plug 40 is introduced axially, from left to right when studying FIG. 5, by force-fitting and by elastic deformation of the front free end portion 27 of the duct 26 as far, for example, as the position illustrated in FIG. 6.

Insertion inside the duct 26 is performed, at least in part, before the mounting and fixing of the endpiece 30.

Depending on the axial or longitudinal position that the plug 40 then occupies inside the front free end portion 27 of the duct 26, and as the stem 36 is being introduced axially into the latter, the rear transverse end face 38 of the stem 36 collaborates in this example with the convex spherical wall of the plug 40 in order to axially "push" the latter further into the front free end portion 27 of the duct 26.

Nonlimitingly, and to further improve the quality of the seal and the retention of the rear free end portion of the stem 36 of the front endpiece 30 inside the front free end portion 27 of the duct 26, additional bonding-together or welding-together of these elements may be provided.

As a variant, the welding and/or the bonding replaces or supplements the axial force-fitting by elastic deformation and provides the sealing and the axial retention of the rear free end portion of the stem 36 inside the front free end portion 27 of the duct 26.

In the assembled position, and because of the elastic deformation of the lateral wall, and the deformation of the deflector toward the inside of the structure, in this instance over half a circumference, of the aerodynamic deflector 24 at the level of the spherical ball inserted into the duct 26 to form a plug, a localized bulge may be visible from the outside.

Such a bulge may be completely or partially hidden by the lateral wall of the front endpiece 30 and the axial length of that wall may be adapted for that purpose.

In general, the principle behind the invention, which consists in combining the sealed plugging effects resulting from the stem 36 with a distinct additional component, lead to a series of possible designs for the plug whereby, for preference, the plug comprises at least one plugging body of which the transverse cross section is the mate of that of the free end portion of said duct, and notably a plugging body 40 exhibiting symmetry of revolution.

Figure 7:
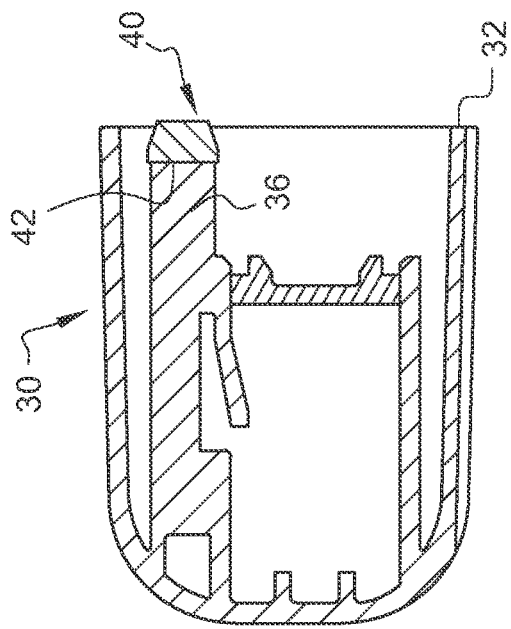
FIG. 7 is a view similar to that of FIG. 5, illustrating a first design variant of the endpiece and of the plug which together plug the liquid circulation duct.
Figure 7:
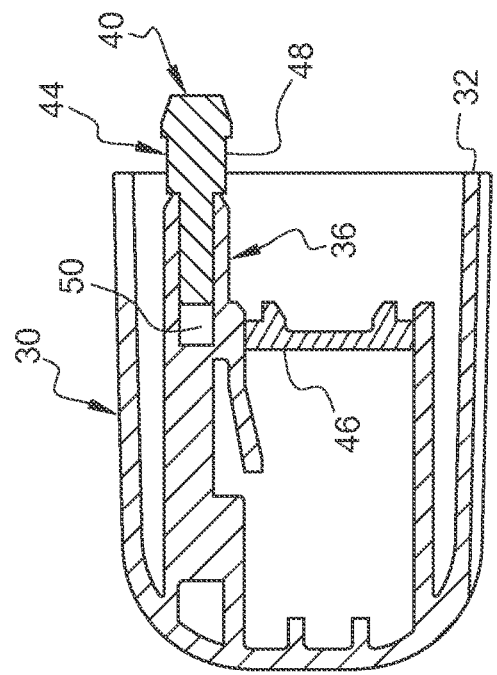
Figure 7:
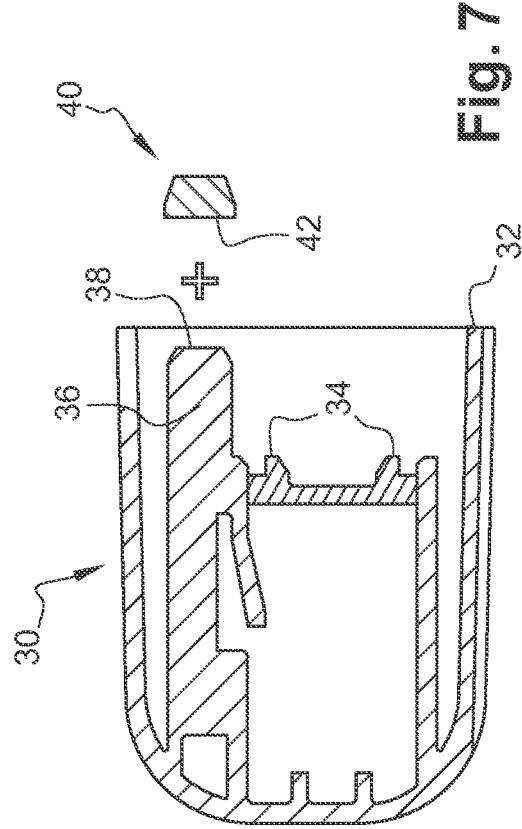

According to a first design variant illustrated schematically in FIG. 7, the plug 40 takes the form of a cone frustum of which at least the front part (to the left when considering FIG. 7, the plug 40 has an outside diameter of the same order of size as that of the spherical ball, so as to ensure axial force-fitting of same in the front free end portion 27 of the duct 26 of the deflector 24.

To facilitate fitting thereof by axial insertion, its smaller-diameter rear end is preferably oriented toward the open free end of the duct 26.

In order to determine this orientation and facilitate the assembly operations, the frustoconical plug 40 has, in its front face 42, a housing (not depicted) able to accept the free end of the stem 36 on which it is then pre-positioned as illustrated in the left-hand part of FIG. 7.

The stem 36 thus acts as a support for the plug 40.

The retention of the plug 40 on the rear free end of the stem 36 may be temporary and provided by friction, or may be permanent, for example using bonding or welding.

Figure 8:
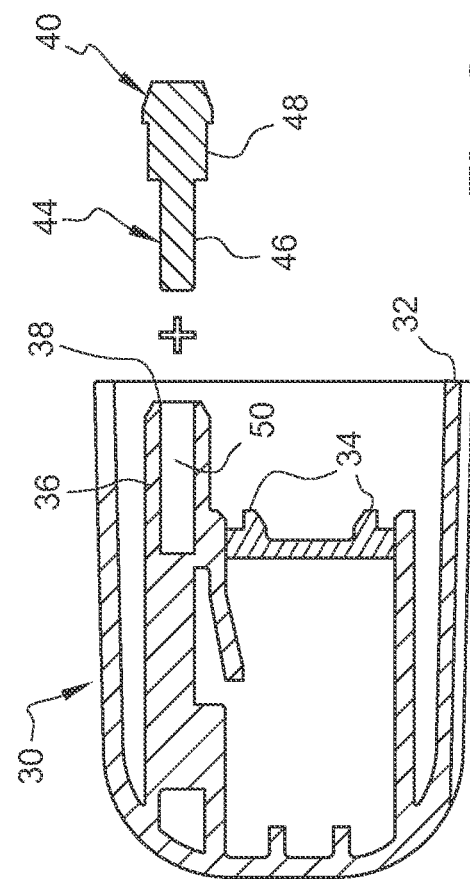
FIG. 8 is a view similar to that of FIG. 5, illustrating a second design variant of the endpiece and of the plug which together plug the liquid circulation duct.

According to a second variant illustrated in FIG. 8, the plugging body of the plug is once again frustoconical as has just been explained with reference to FIG. 7.

In order to be supported by the front endpiece 30, the plugging body is extended axially forward by a stepped stem 44 of which the front free end portion 46 is housed axially in a complementary bore 50 of the stem 36 which, for this purpose, is tubular in design.

The radial shoulder which delimits the front portion 46 which is smaller in diameter in comparison with the larger-diameter rear portion 48, collaborates with the annular transverse end face of the stem 36 to determine the axial position of the plugging body with respect to the front endpiece 30, and therefore, after assembly, inside the duct 26.

By way of variants which have not been depicted, the invention is not restricted to a single duct formed in an aerodynamic deflector.

The aerodynamic deflector may for example comprise two parallel lateral ducts.

The duct is not necessarily lateral; it may also be formed inside the central part forming the body of the aerodynamic deflector.

In addition, the accessory such as an aerodynamic deflector is not necessarily made in a single piece extending over the entire length of the wiper frame.

Nor is the invention limited to a wiper frame of the "flat blade" type, it being possible for the structure intended to support the blade rubber to be an articulated structure, such as a structure involving brackets.

The invention claimed is:

1. A wiper frame comprising a liquid distributing and/or spraying device comprising:
   at least one liquid circulation duct of which one longitudinal end opens into an end face of the device;

a plug for plugging said longitudinal end of the liquid circulation duct and which is inserted into a longitudinal end portion of said liquid circulation duct; and an endpiece arranged facing said end face of the device, wherein the endpiece comprises a stem which is received inside said longitudinal end portion of said duct, wherein the plug is a component distinct from the endpiece, so that the endpiece and the plug together plug said longitudinal end of the liquid circulation duct; and wherein the plug has an outer diameter greater than an inner diameter of the liquid circulation duct such that the liquid circulation duct is elastically deformed when the plug is inserted.

2. The wiper frame as claimed in claim 1, wherein the plug comprises at least a plugging body of which a transverse cross section is a mate of that of a free end portion of said duct.

3. The wiper frame as claimed in claim 2, wherein the plug comprises an insertion shank which axially extends the plugging body.

4. The wiper frame as claimed in claim 3, wherein:
the endpiece comprises a stem that is received inside the longitudinal end portion of the duct,
the stem of the endpiece is tubular, and
the insertion shank is housed in a complementary bore of the stem.

5. The wiper frame as claimed in claim 1, wherein the plug comprises a plugging body exhibiting symmetry of revolution, and in that a transverse cross section of the longitudinal end portion of the liquid circulation duct is circular.

6. The wiper frame as claimed in claim 5, wherein the plugging body of the plug is a spherical body.

7. The wiper frame as claimed in claim 5, wherein the plugging body of the plug is a portion of a sphere, of a cone, or of a cylinder.

8. The wiper frame as claimed in claim 1, wherein the plug for plugging said end of the liquid circulation duct is inserted axially into said longitudinal end portion of said duct.

9. The wiper frame as claimed in claim 1, wherein the stem is fixed inside said longitudinal end portion of the liquid circulation duct by bonding, welding, or force-fitting.

* * * * *